(12) United States Patent
Liu et al.

(10) Patent No.: US 7,991,440 B2
(45) Date of Patent: *Aug. 2, 2011

(54) ROTARY MECHANISM FOR PORTABLE ELECTRONIC DEVICE

(75) Inventors: Ye Liu, Shenzhen (CN); Hsiao-Hua Tu, Taipei Hsien (TW); Yan-Ling Gao, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 504 days.

This patent is subject to a terminal disclaimer.

(21) Appl. No.: 12/146,566

(22) Filed: Jun. 26, 2008

(65) Prior Publication Data
US 2009/0268389 A1    Oct. 29, 2009

(30) Foreign Application Priority Data
Apr. 25, 2008  (CN) .......................... 2008 1 0301307

(51) Int. Cl.
*H04B 1/38* (2006.01)

(52) U.S. Cl. ............... 455/575.1; 455/575.3; 455/575.4; 455/575.8; 455/90.3

(58) Field of Classification Search ............... 455/575.1, 455/575.3, 575.4, 575.8, 90.3
See application file for complete search history.

(56) References Cited

U.S. PATENT DOCUMENTS

| 7,586,538 B2 * | 9/2009 | Cho .............................. 348/374 |
| 2004/0018862 A1 * | 1/2004 | Godston et al. ............ 455/575.3 |
| 2009/0188339 A1 * | 7/2009 | Liu et al. ........................ 74/470 |

* cited by examiner

*Primary Examiner* — Tuan Pham
(74) *Attorney, Agent, or Firm* — Steven M. Reiss

(57) ABSTRACT

A rotatable connecting mechanism (100) includes a cover (10), a base (30), a toothed element (20) and an elastic element (24). The cover is rotatably mounted on the base (30). The toothed element (20) on a surface of the cover (10) facing to the base (30). The toothed element (20) defining a plurality of toothed grooves (222) around a peripheral wall thereof. The elastic element (24) having an engaging portion (2422) formed thereon and configured on a surface of the base (30) facing to the cover (10). The engaging portion (2422) rotatably engages 5 the plurality of toothed grooves (222).

12 Claims, 6 Drawing Sheets

ROTARY MECHANISM FOR PORTABLE ELECTRONIC DEVICE

CROSS-REFERENCE TO RELATED APPLICATIONS

This application is related to co-pending U.S. patent application Ser. No. 12/146,564, entitled "ROTATABLE CONNECTING MECHANISM FOR A PORTABLE ELECTRONIC DEVICE", by Ye Liu et al. The application has the same assignee as the present application and has been concurrently filed herewith. The above-identified applications are incorporated herein by reference.

BACKGROUND

1. Field of the Invention

The present invention generally relates to rotary mechanisms and, particularly, to a rotary mechanism for portable electronic devices.

2. Description of Related Art

With the development of wireless communication and information processing technologies, portable mobile terminals, such as mobile phones and personal digital assistants (PDAs), are now in widespread use.

Typical portable electronic devices such as mobile phones mainly include bar mobile phones, foldable mobile phones, slidable mobile phones, and rotatable mobile phones. Rotatable mobile phone has a newer structure which allows the mobile phone to be compact with a modern, novel design.

A traditional rotating mechanism for a mobile phone includes a cover configured with a display, a base configured with a keypad, and a connecting mechanism making the cover rotatable with the base. The connecting mechanism is configured so the cover slides automatically to a desired position relative to the base when the cover is rotated beyond a predetermined position. When the mobile phone is closed, the cover covers the base, and the keypad is hidden. When using the mobile phone, the cover can be rotated to a desired position by the connecting mechanism, exposing the keypad.

However, the rotatable mechanism is configured without an integrated mechanism, thus vibrations may occur during the rotating of the cover of the portable electronic device.

Therefore, there is a room for improvement within the art.

BRIEF DESCRIPTION OF THE DRAWINGS

Many aspects of the exemplary rotary mechanism and a portable electronic device using the same can be better understood with reference to the following drawings. The components in the various drawings are not necessarily drawn to scale, the emphasis instead being placed upon clearly illustrating the principles of the present rotary mechanism and a portable electronic device using the same. Moreover, in the drawings, like reference numerals designate corresponding parts throughout the diagrams.

DETAILED DESCRIPTION OF THE INVENTION

Figure 1:
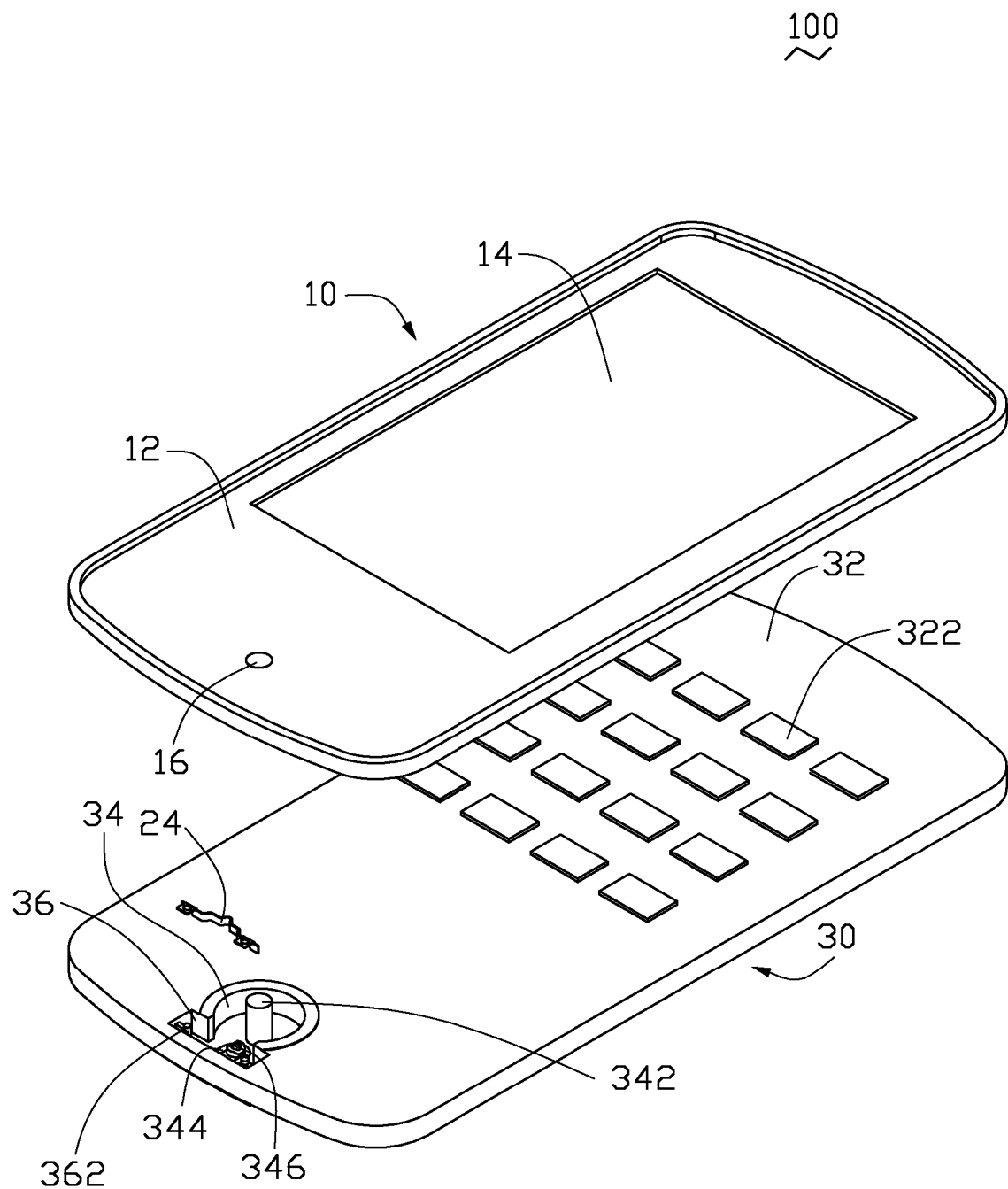
FIG. 1 is an exploded schematic view of the rotary mechanism according to an exemplary embodiment.
Figure 2:
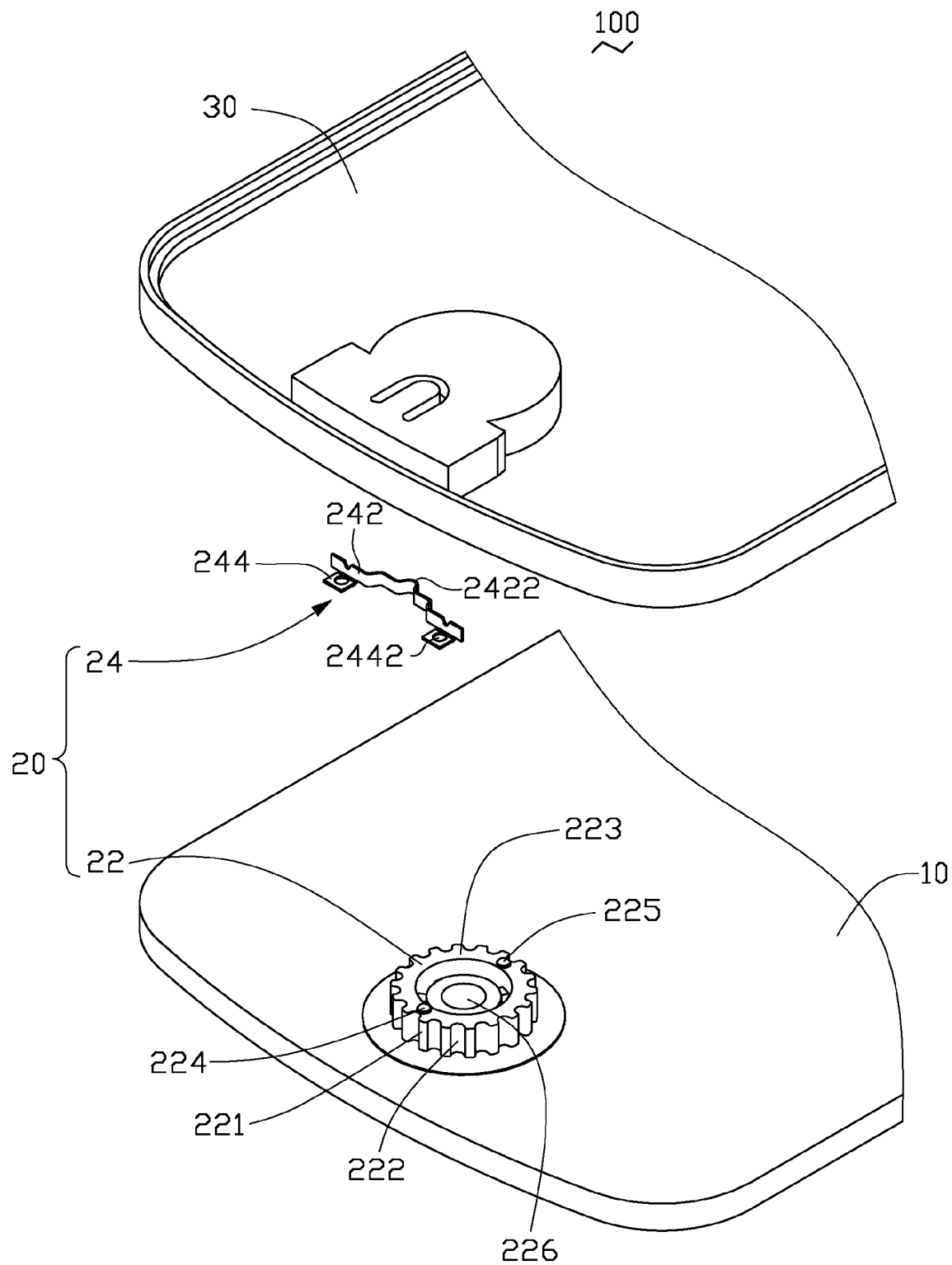
FIG. 2 is a partly exploded schematic view of the rotary mechanism shown in FIG. 1 from another aspect.

The exemplary rotary mechanism is suitable for a portable electronic device with a rotary structure, such as a rotatable mobile phone. Referring to FIGS. 1 and 2, a rotary mechanism 100 includes a cover 10, an engaging unit 20 and a base 30 connected with the cover 10 by the engaging unit 20. The cover 10 can be rotated about the engaging unit 20 relative to the base 30.

The cover 10 has a display screen 14 defined at an end thereof and is for displaying information of the portable electronic device. The cover 10 has an engaging hole 16 defined in another end thereof and is configured for engaging the base 30.

The engaging unit 20 includes a round, toothed element 22 fixed on the cover 10 and an elastic sheet 24 engaging with the toothed element 22. A plurality of toothed grooves 222 are defined around a peripheral wall 221 of the toothed element 22.

The toothed element 22 has a surface 223 facing the base 30. The surface 223 has a first protrusion 224 and a second protrusion 225 located symmetrically to the first protrusion 224.

A limiting hole 226 is defined along the axis of the toothed element 22 and in the central portion of the toothed element 22 corresponding to the engaging hole 16. The limiting hole 226 has the same shape and size as the engaging hole 16. The limiting hole 226 is configured for communicating with the engaging hole 16 defined in the cover 10.

The elastic sheet 24 includes a main body 242 and a pair of connecting portions 244. The main body 242 is an arched sheet with an engaging portion 2422 defined in the central portion thereof. The engaging portion 2422 meshes with the plurality of toothed grooves 222. The connecting portions 244 are respectively extended vertically from both ends of the main body 242. In present embodiment, each of the connecting portions 244 is a rectangular sheet with a locking hole 2442 defined therethrough. The locking holes 2442 are configured for attaching the elastic sheet 24 to the base 30.

A keypad 32 in the base 30 facing the cover 10 allows inputting information. The keypad 32 includes a plurality of keys 322. A groove (not labeled) is defined in the base 30 for receiving the toothed element 22 and the elastic sheet 24. The groove includes a first receiving groove 34 for receiving the toothed element 22 and a second receiving groove 36 for receiving the elastic sheet 24. The first receiving groove 34 and the second receiving groove 36 communicate with each other.

The first receiving groove 34 has substantially the same shape as the toothed element 22. A post 342 formed on a bottom wall of the first receiving groove 34 cooperates with the limiting hole 226. The post 342 is inserted through the limiting hole 226 and the engaging hole 16, so the cover 10 can rotate relative to the base 30 with the post 342 as an axis.

Figure 3:
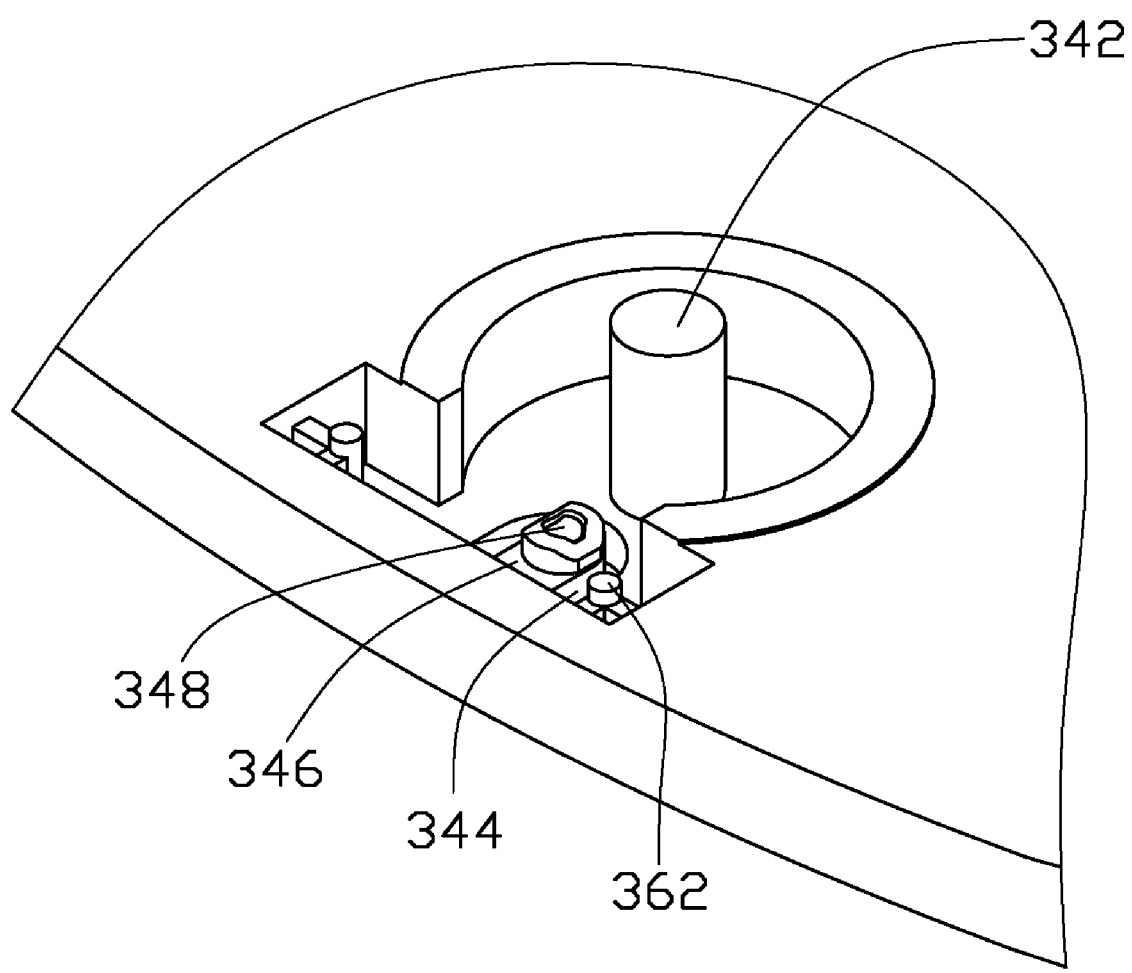
FIG. 3 is a partly enlarged view of the rotary mechanism shown in FIG. 1.

Referring further to FIG. 3, a U-shaped aperture 344 is defined in the bottom wall of the groove, and a warping portion 346 is formed in the bottom wall of the groove. A slot 348 (referring to FIG. 5) is defined in the warping portion 346 for engaging with the first protrusion 224 and second protrusion 225.

The second receiving groove 36 is a rectangular slot defined on one side of the first receiving groove 34. Two fixing portions 362 are formed on a bottom wall of the second receiving groove 36 corresponding to the connecting portions 244 of the elastic sheet 24. The two fixing portions 362 are two exemplary posts which can be inserted through the locking hole 2442. The fixing portion 362 and the elastic sheet 24 can be integrally formed together by such means as hot melt, so that the elastic sheet 24 is fixed into the second receiving groove 36.

Figure 4:
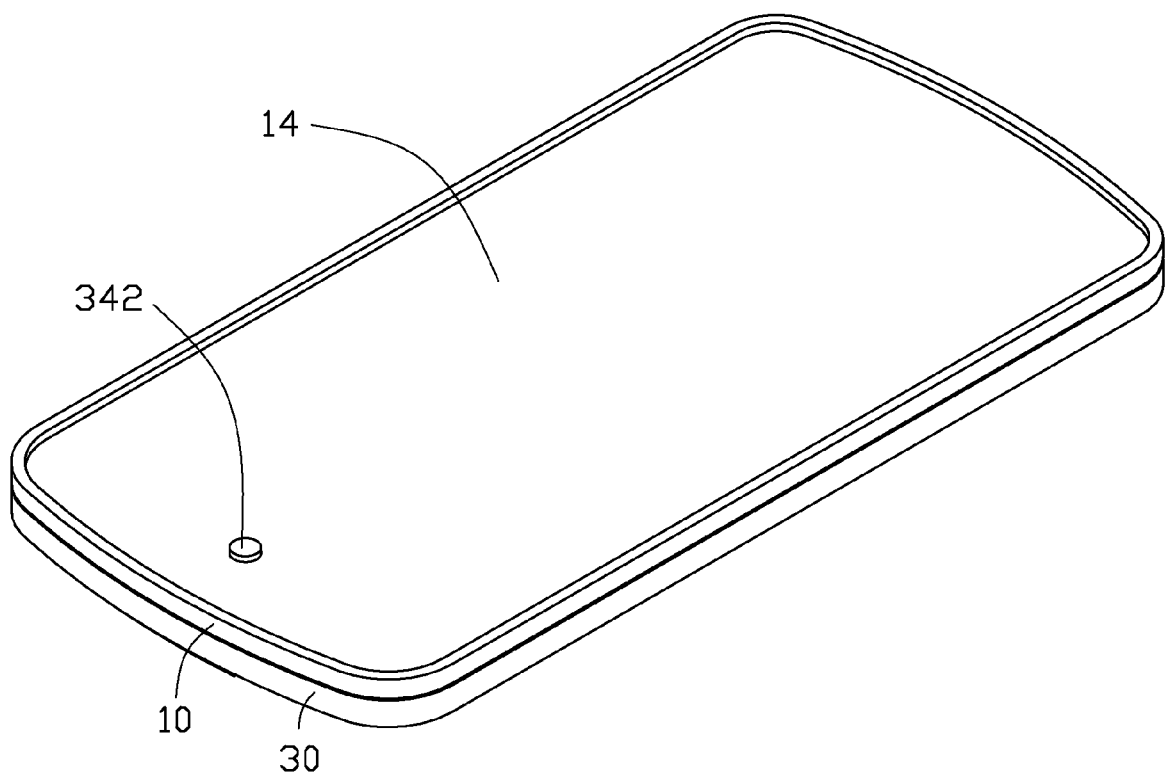
FIG. 4 is an assembled schematic view of the rotary mechanism shown in FIG. 1.
Figure 5:
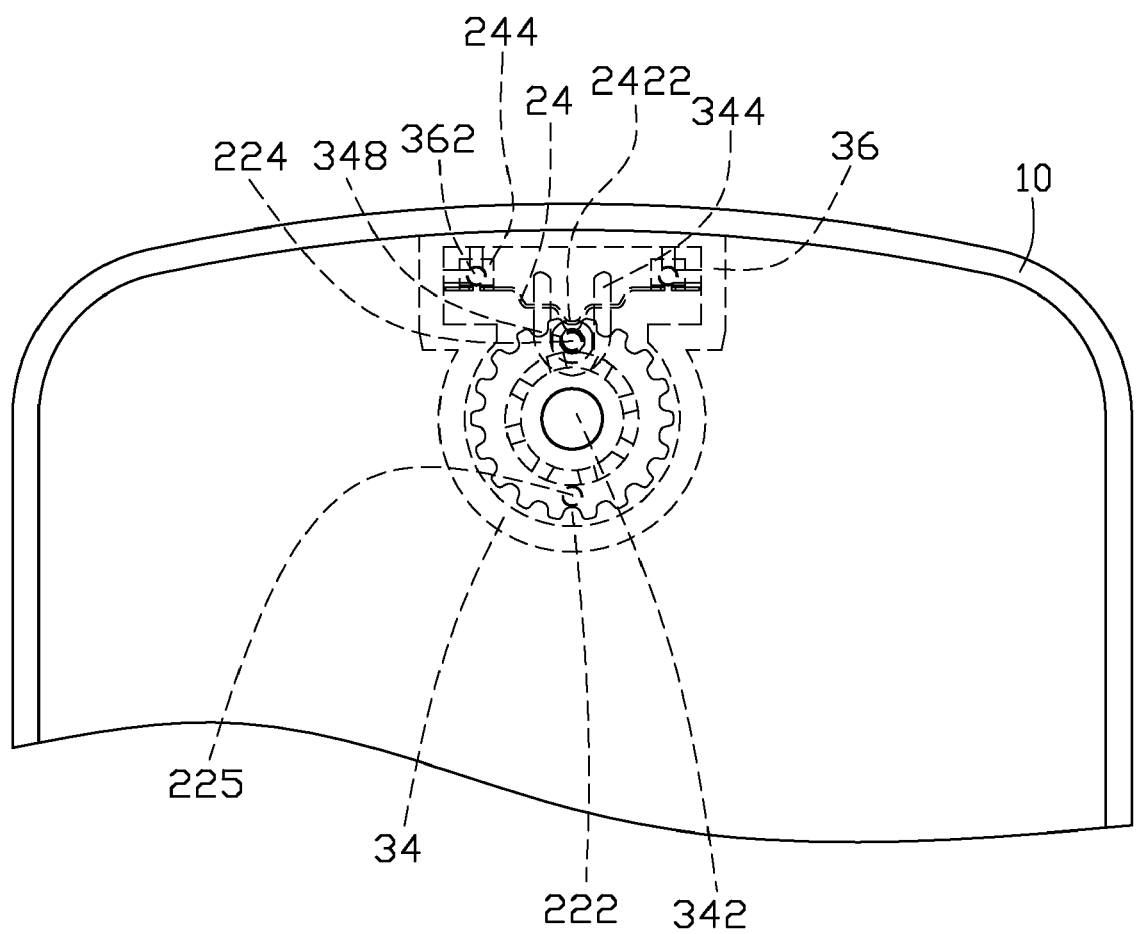
FIG. 5 is a partly perspective view of the rotary mechanism shown in FIG. 4.
Figure 6:
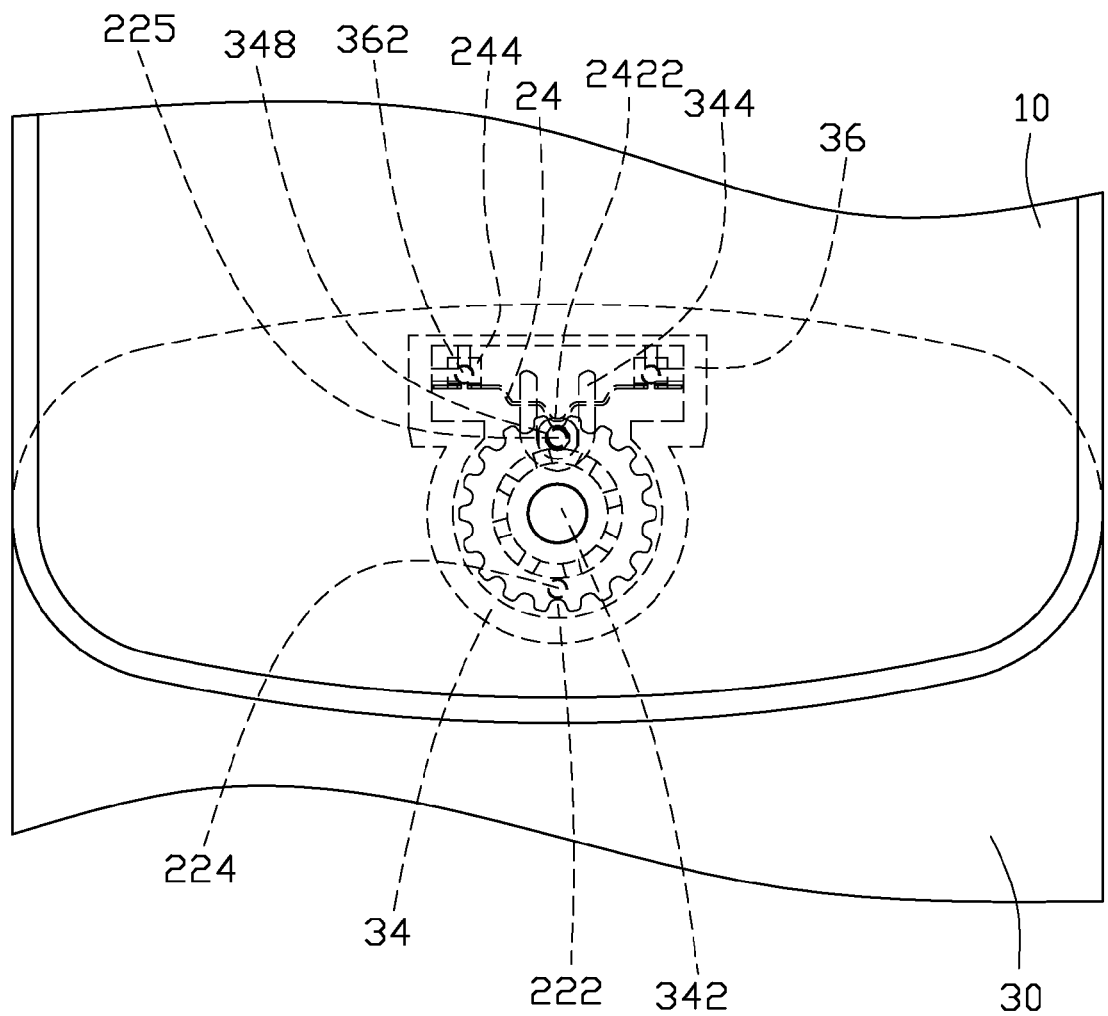
FIG. 6 is a partly perspective view of the rotary mechanism shown in FIG. 5 with a cover rotated away from a base.

Referring to FIGS. 4 and 5, when assembled, the toothed element 22 is fixed to the cover 10. The locking holes 2442 of the connecting portions 244 of the elastic sheet 24 engage with the fixing portions 362 so that the elastic sheet 24 is fixed to the base 30. The post 342 is inserted through the limiting hole 226 defined in the toothed element 22 and the engaging hole 16 in the cover 10. The engaging portion 2422 of the elastic sheet 24 engages any one of the toothed grooves 222 of the toothed element 22, and the first protrusion 224 is disposed in the slot 348 of the base 30.

Referring to FIG. 5, in use, when the cover 10 is rotated in a the clockwise direction, the first protrusion 224 is released from the slot 348 and the engaging portion 2422 rotatably engages with the plurality of toothed grooves 222 until the cover 10 is rotated to desired angle that the cover 10 rotated relative to the base 30.

It should be understood that, the toothed element 22 and the cover 10 can be fixed together by glue or hot melt, and the toothed element 22 and the cover 10 can also be formed into a single unit.

One main advantage of the present embodiment is as follows. The engaging portion 2422 rotatably and sequentially engages with any one of the toothed grooves 222, thus the cover 10 can be rotated relative to the base 30 to a desired angle and may be oriented at the corresponding position. The engagement between the engaging portion 2422 and the toothed grooves 222 can effectively reduce vibrations occurring during the rotation of the cover 10 so as to attain a stable rotation of the cover 10 relative to the base 30.

Another advantage of the present embodiment is as follows. The plurality of toothed grooves 222 are circumferentially defined along the peripheral wall 221 of the toothed element 22, thus the cover can be rotated about 360 degrees relative to the base 30.

A still advantage of the present embodiment is as follows. When the rotary mechanism 100 is in a closed state, the first protrusion 224 is disposed in the slot 348. A pause feeling can be generated as the cover 10 starts to rotate relative to the base 30. Due to the second protrusion 225 being located symmetrically to the first protrusion 224, when the cover rotates about 180 degrees, another pause feeling can also be generated.

It is to be further understood that even though numerous characteristics and advantages of the present embodiments have been set forth in the foregoing description, together with details of structures and functions of various embodiments, the disclosure is illustrative only, and changes may be made in detail, especially in matters of shape, size, and arrangement of parts within the principles of the present invention to the full extent indicated by the broad general meaning of the terms in which the appended claims are expressed.

What is claimed is:

1. A rotary mechanism, comprising:
   a base;
   a cover rotatably mounted on the base;
   a toothed element on a surface of the cover facing the base, the toothed element defining a plurality of toothed grooves around a peripheral wall thereof; and
   an elastic sheet including a main body with an engaging portion formed in the middle thereof configured on a surface of the base facing to the cover, the engaging portion rotatably engaging the plurality of toothed grooves, a connecting portion extending from each end of the main body, and a second receiving groove having a bottom wall defined in the surface of the base facing to the cover, two fixing portions formed on the bottom wall of the second receiving groove, the elastic sheet received in the second receiving groove, and each connecting portion fixed to one of the fixing portions.

2. The rotary mechanism as claimed in claim 1, wherein an engaging hole is defined in the cover, a limiting hole is defined in the toothed element, and a post formed on the base is inserted through the limiting hole and the engaging hole, the cover rotating relative to the base with the post as an axis.

3. The rotary mechanism as claimed in claim 2, wherein a first receiving groove having a bottom wall is defined in the surface of the base facing to the cover, a post protrudes form the bottom wall, and the toothed element is received in the first receiving groove.

4. The rotary mechanism as claimed in claim 2, wherein the cover includes a display adjacent to on one end of the cover, the engaging hole adjacent the other end of the cover and for engaging with the base.

5. The rotary mechanism as claimed in claim 1, wherein each connecting portion has a locking hole defined therethrough, each fixing comprises a post inserted in one of the locking holes.

6. The rotary mechanism as claimed in claim 1, wherein a first protrusion and a second protrusion are protruding form the surface of the toothed element facing to the base, the base having a slot engaging with the first protrusion and the second protrusion.

7. A portable electronic device, comprising:
   a base having a keypad configured thereon;
   a cover rotatably mounted on the base and including a display screen configured adjacent to on one end thereof;
   a toothed element on a surface of the cover facing the base, the toothed element defining a plurality of toothed grooves around a peripheral wall thereof; and
   an elastic sheet including a main body with an engaging portion formed in the middle thereof configured on a surface of the base facing to the cover, the engaging portion rotatably engaging the plurality of toothed grooves, each connecting portion extending from each end of the main body, and a second receiving groove having a bottom wall defined in the surface of the base facing to the cover, two fixing portions formed on the bottom wall of the second receiving groove, the elastic sheet received in the second receiving groove, and each connecting portion fixed to one of the fixing portions.

8. The portable electronic device as claimed in claim 7, wherein an engaging hole is defined in the cover, a limiting hole is defined in the toothed element, and a post formed on the base is inserted through the limiting hole and the engaging hole, the cover rotating relative to the base with the post as an axis.

9. The portable electronic device as claimed in claim 8, wherein a first receiving groove having a bottom wall is defined in the surface of the base facing to the cover, a post protrudes form the bottom wall, and the toothed element is received in the first receiving groove.

10. The portable electronic device as claimed in claim 8, wherein the cover includes a display adjacent to on one end of the cover, the engaging hole adjacent the other end of the cover and for engaging with the base.

11. The portable electronic device as claimed in claim 7, wherein each connecting portion has a locking hole defined therethrough, each fixing portion comprises a post inserted in one of the locking holes.

12. The portable electronic device as claimed in claim 7, wherein a first protrusion and a second protrusion are protruding form the surface of the toothed element facing to the base, the base having a slot engaging with the first protrusion and the second protrusion.

* * * * *